United States Patent [19]

Bauer

[11] Patent Number: 5,780,696

[45] Date of Patent: Jul. 14, 1998

[54] PROCESS FOR RECYCLING PLASTIC WASTE

[75] Inventor: Siegfried Bauer, Graefelfing, Germany

[73] Assignee: Solvay (Société Anonyme), Brussels, Belgium

[21] Appl. No.: 804,577

[22] Filed: Feb. 24, 1997

[30] Foreign Application Priority Data

Feb. 29, 1996 [BE] Belgium ................. 09600175

[51] Int. Cl.$^6$ .............. C07C 1/00; C07C 4/04; C10G 1/00; C10G 51/02
[52] U.S. Cl. .............. 585/241; 585/240; 585/648; 208/50; 208/53; 208/54; 208/400; 201/21; 201/22; 201/23; 201/25; 423/488
[58] Field of Search ............. 585/241, 240, 585/648; 201/25, 21, 22, 23; 208/400, 50, 53, 54

[56] References Cited

U.S. PATENT DOCUMENTS

| | | | |
|---|---|---|---|
| 3,829,558 | 8/1974 | Banks et al. | 423/481 |
| 5,464,602 | 11/1995 | Evans et al. | 423/488 |
| 5,569,801 | 10/1996 | De Broqueville | 585/241 |
| 5,608,136 | 3/1997 | Maezawa et al. | 588/228 |
| 5,639,937 | 6/1997 | Hover et al. | 585/241 |

FOREIGN PATENT DOCUMENTS

| | | |
|---|---|---|
| 3616785 | 11/1987 | Germany . |
| 4207976 | 9/1993 | Germany . |
| 4340364 | 6/1995 | Germany . |
| 2158089 | 11/1985 | United Kingdom . |

Primary Examiner—Bekir L. Yildirim
Attorney, Agent, or Firm—Spencer & Frank

[57] ABSTRACT

The invention relates to a process for recycling waste which consists essentially of one or more plastics comprising polyvinyl chloride (PVC), in which:

the waste is mixed with a heavy oil, in a reactor under an inert atmosphere, at an internal temperature of at least 300° C., and the hydrogen chloride (HCl) which is evolved is collected;

the contents of the reactor are then cracked at a temperature of at least 400° C., and at least part of the gases which are evolved are extracted from the reactor;

the contents of the reactor are then cooled and the residual solid product is collected.

HCl, coke, hydrocarbon gases and various oils are thus mainly obtained.

8 Claims, No Drawings ns. 5,780,696

PROCESS FOR RECYCLING PLASTIC WASTE

FIELD OF THE INVENTION

The present invention relates to the recycling of plastic waste, in particular waste rich in polyvinyl chloride (PVC).

Technology Review

Given the very wide use of plastics in the manufacture of articles of large-scale consumption such as packaging, bottles, etc., the recycling of plastics is currently of great importance, both industrially and environmentally. The most basic form of recycling is, of course, the pure and simple re-use of used articles, after basic reconditioning operations such as washing. However, many plastic-based articles cannot be re-used, for example on account of risks of pollution in the case of articles intended for food packaging, or alternatively for reasons of mechanical strength.

Another form of recycling consists in reducing the used articles into particles of small size, for example by grinding, and in reusing them in the same way as the original material, for example by extrusion or by injection, optionally as a mixture with a certain amount of original material. However, this method of recycling may lead to poor results when the recycled articles are not of the same nature, are soiled, comprise different additives, carry labels, etc. Prior separation steps, which are often difficult to automate, are then generally required.

This method may also, in certain cases, result in slight degradation of the polymers thus treated, under the effect of heat. In particular, if the waste thus treated comprises PVC, hydrogen chloride (HCl) may be evolved if the implementation conditions are not judiciously selected and controlled.

A final solution is thermal recycling, which consists simply in incinerating the plastics in order to recover their energy content. However, this solution has the drawback of totally degrading the plastics without recovering any starting material, and requires expensive plants, in particular as regards the treatment of fumes.

Consequently, intermediate methods of recycling have also been developed, which, while involving partial degradation of the plastics treated, make it possible, however, to recover one or more reusable starting materials, for example HCl and liquid, solid and/or gaseous hydrocarbon products ("feedstock recycling").

Thus, for example, in Document DE-A-3,616,785, various liquid and/or solid organic wastes, which may comprise plastics, are pyrolysed at high temperature, in a fluidized bed, in an atmosphere containing hydrogen. However, besides the restrictions imposed by the use of hydrogen, this also presents considerable safety risks.

According to Document GB-A-2,158,089, plastics recovered from a first reactor are pyrolysed, optionally in the presence of a small amount of a heavy oil (10% of the weight of the plastics), at temperatures which are sufficient to bring about their complete vaporization (500° C). The gases thus obtained are conveyed to a second reactor where they undergo cracking at 500°–600° C. The atmosphere present in each of the two reactors preferably contains oxygen, in order to bring about at least partial in situ combustion so as to reduce the external heat inputs. However, the use of two reactors requires complex and expensive plants and the use of temperatures of about 600° C. leads to a high energy consumption.

In these known processes, which do not specifically relate to the recycling of PVC-rich plastic waste, the HCl which is evolved is generally considered as an interfering by-product since it is a corrosive product for which care must be taken not to allow it to escape freely; it is therefore generally neutralized (for example converted into salt). However, it is a fundamental chemical product which can advantageously be recovered and reused, in particular in various synthetic processes. Such recycling is more rational and more viable than simple neutralization.

Lastly, in the abovementioned known processes, no detail is provided as regards the systems for introducing the waste into the reactor, although this introduction poses many problems, such as gas leaks to the exterior, in particular if the process takes place under pressure.

SUMMARY OF THE INVENTION

The present invention is consequently directed towards providing a process for recycling plastics which is simple to carry out, can be applied to a wide variety of plastics, in particular PVC-rich plastics, and which makes it possible to recover a maximum amount of reusable products. In particular, one of the objectives of this process is to be able to convert a large proportion of plastics into a solid product with a low chlorine content.

DETAILED DESCRIPTION OF THE INVENTION

More precisely, the invention relates to a process for recycling waste which consists essentially of one or more plastics comprising polyvinyl chloride (PVC), in which:

(a) the waste is mixed with a heavy oil, in a reactor under an inert atmosphere, at an internal temperature of at least 300° C., and the hydrogen chloride (HCl) which is evolved is collected;

(b) the contents of the reactor are then cracked at a temperature of at least 400° C., and at least part of the gases which are evolved are extracted from the reactor;

(c) the contents of the reactor are then cooled and the residual solid product is collected.

Most of the steps of the process take place in a closed container, described as a reactor, which is of suitable chemical and mechanical strength. It is equipped with means of heating, and optionally with means of cooling, as well as devices which allow the introduction of the plastic waste and collection of the solid, liquid and/or gaseous products formed. It is preferably fitted with means of stirring, for example one or more propellers driven by one or more external motors.

The pressure prevailing inside the reactor is generally at least equal to atmospheric pressure; it is preferably approximately equal thereto.

Although the preceding description of the process of the invention relates to an operation of discontinuous (batch) type, this process may also be performed continuously, by means of a few adaptations which are obvious to those skilled in the art.

In order to carry out the process described above continuously, one possibility consists in particular in using a reactor of elongate shape containing several zones brought to different temperatures, the contents of the reactor passing from one zone to another, for example under the effect of an Archimedean screw or another suitable displacing device.

Besides PVC, the waste may comprise one or more plastics of different nature. The process gives particularly advantageous results when it is applied to plastics consisting essentially of thermoplastic materials (for example polyolefins, polystyrene, polyethylene terephthalate or vinyl chloride polymers), and in particular to waste which comprises at least 50% by mass of PVC. One of the advantages of the process of the invention, which is not displayed by the processes known hitherto, is that no upper limit needs to be imposed on the PVC content of the waste.

The indication that the waste "consists essentially" of plastics means that the waste may also contain a small proportion of waste of a different nature, for example labelling debris or stains. The presence of such constituents, although undesirable, is generally inevitable. If need be, a prior sorting step aimed at reducing the proportion of such constituents in the waste may be envisaged.

Advantageously, the size of the waste is reduced beforehand, for example by grinding and/or by melting. The waste may be ground in any conventional device known for this purpose, such as a shredder, grinder, etc. Preferably, a device is used which makes it possible to obtain particles with an average size of about 1 to 20 mm. Once ground, the waste is introduced into the reactor by any conventional device, for example by means of a volumetric measuring tank which is cooled (in order to reduce the risk of sticking together). In the case of direct introduction of the waste in the solid state, it is desirable for the introduction devices to comprise means of leak-proofing which reduce to the minimum the leaks to the exterior of the gases contained in the reactor, especially when the process takes place under pressure.

Melting of the waste may be carried out using any known melting device, such as a blender, extruder, etc., installed close to the reactor and connected to it. According to a particularly advantageous variant, the waste is initially melted and introduced into the reactor by means of an extruder. The extruder die is preferably located, in the reactor, lower than the level of the oil. If necessary, it may be useful to reduce the size of the waste beforehand, for example by grinding as described above, before introducing it into the extruder.

In the case where an extruder is used, it is easy to introduce the waste into the reactor without running the risk of giving rise to leaks of the gases formed in the progress of the process, even if this process takes place under pressure.

One particular advantage associated with the introduction of the waste in the molten state is that the heating power of the reactor may be reduced relative to an introduction in the solid state. Conversely, for an equal heating power, the total duration of the process is reduced. Another advantage of such a mode of introduction is that the risk of an agglomeration of particles which are not fully molten at the bottom of the reactor or on its walls is significantly reduced, on account of the already molten state of the waste introduced into the reactor.

When the waste is introduced into the reactor in the molten state, in particular by means of an extruder, it is advantageously at a temperature of about 180° to 220° C., so as to avoid any substantial dehydration of PVC outside the reactor, and in particular in the extruder. If this temperature does not allow certain particles of plastic waste to melt, since they have a higher melting point, this does not damage the smooth running of the process, inasmuch as no blockage or destruction of the melting device results therefrom. If such problems present themselves, it will advantageously be envisaged to introduce the waste directly into the reactor, in the solid state, or to envisage a prior sorting step in order to limit the content in the waste of such particles with a high melting point, or alternatively to reduce further the particle size of the waste particles.

The heavy oil with which the waste is mixed is of a type which is well known elsewhere; it consists, for example, of a residue from the vacuum distillation of petroleum (VCR—vacuum cracked residue) which is in the form of a solid or pasty tar at room temperature but relatively fluid from 150° to 200° C. Its distillation temperature is generally at least 400° C., and preferably at least 450° C. This type of residue is generally low in cost and suitable for carbonization. It is equally possible to use either a single oil or a mixture of several oils.

The proportion of the waste relative to the heavy oil is not critical. It is, however, obvious that too low a proportion of waste does not allow a viable exploitation and that too high a proportion of waste runs the risk of leading to the formation of an extremely thick and viscous mixture which may disrupt the functioning of the optional stirrer device of the reactor and slow down the progress of the process. Good results have been obtained when the ratio of the weight of waste to the volume of heavy oil (before introducing the said waste) was from 0.15 to 1.2 kg/l. Preferably, this ratio is at least 0.5 kg/l. Advantageously, this ratio moreover does not exceed 1 kg/l.

Another advantage of the process of the invention is that it makes it possible simultaneously to recycle plastic waste and waste hydrocarbon products such as oils. Surprisingly, the addition of PVC to hydrocarbon waste of this type greatly increases their aptitude for carbonization.

Besides the heavy oil and the waste, the reactor contains an inert atmosphere, that is to say an atmosphere in which the amount of reactive gases such as oxygen is as low as possible (preferably less than 1% by volume). The well-known inert gases may be used in the context of the present invention, for example nitrogen ($N_2$), $CO_2$, CO, etc. As the process progresses, this atmosphere becomes naturally enriched with gases such as HCl and/or hydrocarbon gases, this enrichment in no way damaging the progress of the process.

During step (a), the internal temperature is advantageously at least 350° C., preferably at least 380° C. The internal temperature is generally not more than 450° C. and preferably not more than 430° C. Advantageously, the heavy oil is introduced into the reactor and brought to the desired temperature before the start of introduction of the waste into the reactor.

The reactor contents are preferably subjected to vigorous stirring. The duration of the step of introduction of the waste into the reactor is advantageously about 30 to 60 minutes, independently of the volume of waste to be treated. As the waste is mixed with the heavy oil in the reactor, HCl originating from PVC is rapidly evolved (dehydrochlorination). This gas is preferably extracted from the reactor and it may then optionally be purified for the purpose of subsequent re-use.

When all of the waste to be treated has been introduced and when its dehydrochlorination is virtually complete, the contents of the reactor are cracked, preferably by raising its temperature. The temperature increase is advantageously 20° to 100° C. relative to the internal temperature at the end of step (a); it is preferably at least 50° C. and most particularly at least 80° C. By dehydrochlorinating the contents of the reactor at a temperature below the cracking temperature, it is effectively possible to reduce the risks of "pollution" with hydrocarbon gases of the HCl collected during the dehydrochlorination. Preferably, the internal temperature during the cracking is at least 450° C. Advantageously, it does not exceed 500° C.

The cracking time is adapted in the usual manner to the volume of the contents of the reactor and to the cracking temperature; it is typically at least 30 minutes, preferably at least one hour. It is generally less than 5 hours and preferably less than 2 hours.

This cracking brings about the evolution of various gaseous, essentially hydrocarbon products, at least some of which is extracted from the reactor and may optionally be reused. Advantageously, the gases are extracted from the reactor such that the pressure remains stable therein, in particular in the region of atmospheric pressure. The gases extracted from the reactor may advantageously be freed of traces of HCl which they may still contain, in particular by neutralization or, preferably, by recovery (for example by bubbling them through water).

Before or after the optional elimination of the HCl which they may contain, the gases extracted from the reactor are generally cooled, optionally in several steps. Usually, this cooling brings about the condensation of some of these gases in the form of liquid and/or bituminous fractions, whereas another part of these gases does not condense.

The cooling of the gases extracted from the reactor and the separation of the liquid and/or bituminous fractions condensed may take place by any means known for this purpose, in particular using a cyclone or any equivalent device, typically maintained at a temperature of about 200° to 300° C. A cyclone offers the advantage of allowing the separation of any particles entrained by the gases. The uncondensed gases thus collected may then be subjected to a more energetic cooling, typically at temperatures of 0° to 25° C., for example in a condenser, thereby allowing an oily liquid fraction to be collected, which may optionally be subjected to fractional distillation. The gaseous fraction which has still not been condensed during this energetic cooling may be conveyed back to the reactor, or alternatively burned to contribute towards heating it. According to an advantageous variant, any uncondensed gaseous fraction collected during condensation of the gases extracted from the reactor during the cracking of its contents is conveyed back to the reactor (recirculation). In this case, these uncondensed gases play a role comparable to that of the inert gas present in the reactor.

Once the cracking is substantially complete, which is seen by the fact that the evolution of gas reduces appreciably, the contents of the reactor are left to cool, for example to room temperature, optionally with the aid of forced cooling.

The residue contained in the reactor, which is generally substantially solid and consists essentially of coke, may then be extracted in order to reuse it, for example as a fuel, after optional grinding. In certain cases, in order to facilitate this extraction, it can also be carried out when the temperature of the contents of the reactor is still high, for example 200° C. The abovementioned operating conditions make it possible to obtain a coke having a very low chlorine content, which is particularly advantageous for the purpose of reusing it, for example as a fuel.

Although the use of a catalyst during cracking is not excluded, according to an advantageous variant of the process no catalyst is added to the reactor, which simplifies the implementation of the process and makes it particularly simple and economical.

EXAMPLES

The examples which follow illustrate the functioning and advantages of the process of the invention in a non-limiting manner. Examples 1, 3, 4 and 5 are in accordance with the invention, and Example 2R is given by way of comparison.

Example 1

1 kg of plastic waste, consisting of PVC originating from mineral water bottles, reduced beforehand into particles about 0.5 to 1 cm in size using a shredder, are introduced into a single-screw extruder, the base of the hopper of which is cooled. This waste is gradually injected, in the molten state, at a temperature of 180° C., into a closed reactor with an approximate volume of 4 l. This reactor was filled beforehand with 1 kg of a heavy oil (vacuum cracked residue oil—VCR) (waste/oil ratio of about 1 kg/l), and was heated to a temperature of about 400° C., with vigorous stirring (60 rpm) and under permanent flushing with nitrogen (about 600 l/h), at atmospheric pressure. After the introduction, the extruder is purged with 0.1 to 0.2 kg of high-density polyethylene.

The waste introduced into the reactor dissolves in the oil and begins to decompose immediately, in particular with considerable evolution of HCl. After about 1 hour, all of the waste has been introduced into the reactor. The internal temperature, which was maintained between 370° and 410° C. during the introduction of the waste, is then brought to about 440° C., which brings about cracking of the viscous material present in the reactor; about 25% by weight of this material becomes gasified and is conveyed to a cyclone maintained at about 250° C. The bituminous and/or liquid fractions condensed in the cyclone are conveyed to the reactor. The gaseous fraction which is not condensed in the cyclone is cooled energetically (20° C.) by means of a condenser, which makes it possible to collect a dark brown liquid which is stored in a reservoir. The gases which have not been condensed in the condenser are purified and stored. In particular, the traces of residual HCl contained in these gases are neutralized by passing them through bubbling chambers filled with aqueous sodium hydroxide solution. After 1 hour, the cracking is substantially complete, and the reactor and its contents are left to cool to about room temperature. A dark, low-density, porous residue (coke) remains in the reactor, and is ground after it has been extracted from the reactor and may optionally be reused as a solid fuel.

The liquid stored in reservoir is then distilled under reduced pressure (20 mm of mercury) in a distillation column, which gives two fractions: between 20° and 200° C., the product has the properties of a light oil, and between 200° and 320° C., it has the properties of a diesel oil. These two fractions are cooled and stored.

During the first hour (waste introduction step), the gaseous fraction leaving the condenser contains about 98% HCl and 2% light hydrocarbon gases. This HCl may be purified and reused. During the second hour, the gaseous fraction leaving the condenser contains about 98% of a mixture of CO, hydrogen and light hydrocarbon gases, the remainder consisting of HCl. This gaseous fraction is conveyed to a device for the water-washing of gas containing 2N caustic soda, so as to neutralize the HCl, and may then be used as a combustible gas.

The amounts of the various products collected, expressed in kg, are indicated in the table below (Ex. 1).

Example 2R

By way of comparison, the procedure described above was applied to 2 kg of the same heavy oil, in the absence of plastic waste.

|  | Ex. 1<br>(PVC + heavy oil) | Ex. 2R<br>(heavy oil alone) |
| --- | --- | --- |
| Coke | 0.70 | 0.50 |
| HCl | 0.45 | — |
| Light oil | 0.24 | 0.50 |
| Diesel oil | 0.36 | 0.64 |
| Gas | 0.10 | 0.10 |
| Waxes | 0.10 | 0.18 |
| Losses | 0.05 | 0.08 |
| Total | 2.00 | 2.00 |

Examples 3 and 4: Treatment of mixtures of PVC and other plastics

According to Example 3, 0.5 kg of a mixture of finely ground waste of PVC and of polystyrene (PS) (in a 75/25 weight ratio) is melted at 190° C., by means of an extruder, and introduced into a stirred reactor containing 1.31 kg of heavy oil preheated to 400° C. (ratio 0.39 kg/l), under inert atmosphere ($N_2$). The same procedure as in Examples 1 and 2R is applied. The products collected are indicated in the table below.

According to Example 4, 0.5 kg of a mixture of finely ground waste of PVC and of polyethylene terephthalate (PET) (in a 75/25 weight ratio) are also introduced, at 190° C., by means of an extruder, into a stirred reactor containing 1.40 kg of heavy oil preheated to 400° C. (ratio 0.36 kg/l), under inert atmosphere ($N_2$). The same procedure as in Example 3 is applied. The products collected are indicated in the table below.

The chlorine content of the coke is very low, typically ≦0.5 g/kg, and is mainly attributed to the heat stabilizer contained in the PVC. The chlorine content of the oily fractions is typically less than 3 g/kg and is mainly attributed to aliphatic organochlorine compounds formed during the cracking. The chlorine content of the hydrocarbon gas fraction is typically ≦2% by volume, essentially HCl, with traces of methyl chloride. After treatment with caustic soda, the chlorine content of the hydrocarbon gases is less than 20 ppm.

|  | Ex. 3<br>PVC + PS (75/25) +<br>heavy oil | | Ex. 4<br>PVC + PET (75/25) +<br>heavy oil | |
| --- | --- | --- | --- | --- |
|  | Products<br>(kg) | Chlorine<br>(g/kg) | Products<br>(kg) | Chlorine<br>(g/kg) |
| Coke | 0.53 | 0.29 | 0.59 | 0.50 |
| HCl | 0.18 | — | 0.18 | — |
| Light oil | 0.20 | 2.70 | 0.28 | 2.90 |
| Diesel oil | 0.11 | 0.25 | 0.25 | 0.16 |
| Gas | 0.34 | ≅0.01 | 0.29 | ≅0.02 |
| Waxes | 0.45 |  | 0.31 |  |
| Total | 1.81 |  | 1.90 |  |

It is seen that the chlorine content of the coke is very low.

Example 5

By applying a procedure similar to that of Examples 3 and 4, the only difference being that a cooled volumetric metering device was used to introduce the waste, a mixture of 0.5 kg of waste PVC and 1.59 kg of heavy oil was treated (ratio of the weight of waste to the volume of oil=0.32 kg/l). Given the various additives it comprised, the PVC was capable of releasing about 250 g of HCl. Based on the results of Example 2R, it might moreover be expected that the 1590 g of heavy oil would lead to the formation of 0.25×1590= 397.5 g of coke. The total amount of coke obtained would therefore theoretically have to have been 250+397.5=647.5 g. However, surprisingly, 1030 g of solid residue (coke) were collected after treatment, i.e. 48% more than theoretically envisaged, which demonstrates the presence of a synergistic effect.

What is claimed is:

1. A process for recycling waste which consists essentially of one or more plastics comprising polyvinyl chloride (PVC), in which (a) mixing the waste with a heavy oil to achieve a ratio of the weight of the waste to the volume of heavy oil from 0.15 to 1.2 kg/l, in a reactor under an inert atmosphere, at an internal temperature of at least 300° C., and collecting hydrogen chloride (HCl) which is evolved;

(b) cracking the contents of the reactor at a cracking temperature of at least 400° C., said cracking temperature being 20° to 100° C. higher than said internal temperature at the end of step (a), and extracting at least part of the gases which are evolved from the reactor;

(c) cooling the contents of the reactor and collecting the residual solid product.

2. The process according to claim 1, in which the waste comprises at least 50% by mass of PVC.

3. The process according to claim 1, in which the waste is initially melted and introduced into the reactor by means of an extruder.

4. The process according to claim 1, in which the ratio of the weight of waste to the volume of heavy oil is from 0.5 to 1 kg/l.

5. The process according to claim 1, in which, during step (a), the internal temperature is from 350° to 450° C.

6. The process according to claim 1, in which any uncondensed gaseous fraction collected during condensation of the gases extracted from the reactor during the cracking of its contents is conveyed back to the reactor.

7. The process according to claim 1, in which no catalyst is added to the reactor.

8. A process for recycling waste which consists essentially of one or more plastics comprising polyvinyl chloride (PVC), in which (a) mixing the waste comprising at least 50% by mass of PVC with a heavy oil to achieve a ratio of the weight of the waste to the volume of heavy oil from 0.5 to 1.0 kg/l, in a reactor under an inert atmosphere, at an internal temperature from 350° to 450° C., and collecting hydrogen chloride (HCl) which is evolved;

(b) cracking the contents of said reactor at a cracking temperature of at least 400° C., said cracking temperature being 20° to 100° C. higher than said internal temperature at the end of step (a), and extracting at least part of the gases which are evolved from the reactor;

(c) conveying any uncondensed gas collected during said extraction back to said reactor;

(d) cooling the contents of said reactor and collecting the residual solid product.

* * * * *